(12) United States Patent
Ming

(10) Patent No.: US 6,478,628 B1
(45) Date of Patent: Nov. 12, 2002

(54) CIGARETTE LIGHTER SOCKET ADAPTER WITH IMPROVED CONTACT, DUAL SOCKETS, AND/OR MOVABLE PLUG

(75) Inventor: Yu Tak Ming, Chaiwan (HK)

(73) Assignee: Teco Industries Company Limited (HK)

( * ) Notice: Subject to any disclaimer, the term of this patent is extended or adjusted under 35 U.S.C. 154(b) by 0 days.

(21) Appl. No.: 09/664,616

(22) Filed: Sep. 19, 2000

(51) Int. Cl.[7] ............................................... H01R 24/04
(52) U.S. Cl. .................................... 439/668; 439/640
(58) Field of Search ................................ 439/638, 639, 439/640, 668

(56) References Cited

U.S. PATENT DOCUMENTS 4,322,122 A * 3/1982 Schwartz et al. ........ 339/147 P
5,847,545 A * 12/1998 Chen et al. ................ 320/138
5,961,353 A * 10/1999 Rivenbark ................. 439/668
5,964,623 A * 10/1999 Maher et al. .............. 439/668

* cited by examiner

Primary Examiner—Gary Paumen
Assistant Examiner—Ann McCamey
(74) Attorney, Agent, or Firm—Bracewell & Patterson, LLP

(57) ABSTRACT

An adapter is shown for a vehicle cigarette lighter socket. The adapter has an adapter body, with a pair of socket members and an oppositely arranged elongate plug member attached to the adapter body. The elongate plug member has an electrical contact at one end which is electrically connected to the adapter via a ribbon form spring contact. The elongate plug member is for insertion into the single vehicle lighter socket and two appliances can be powered from the first and second socket members. The plug member can also be movable relative to said adapter body.

5 Claims, 3 Drawing Sheets

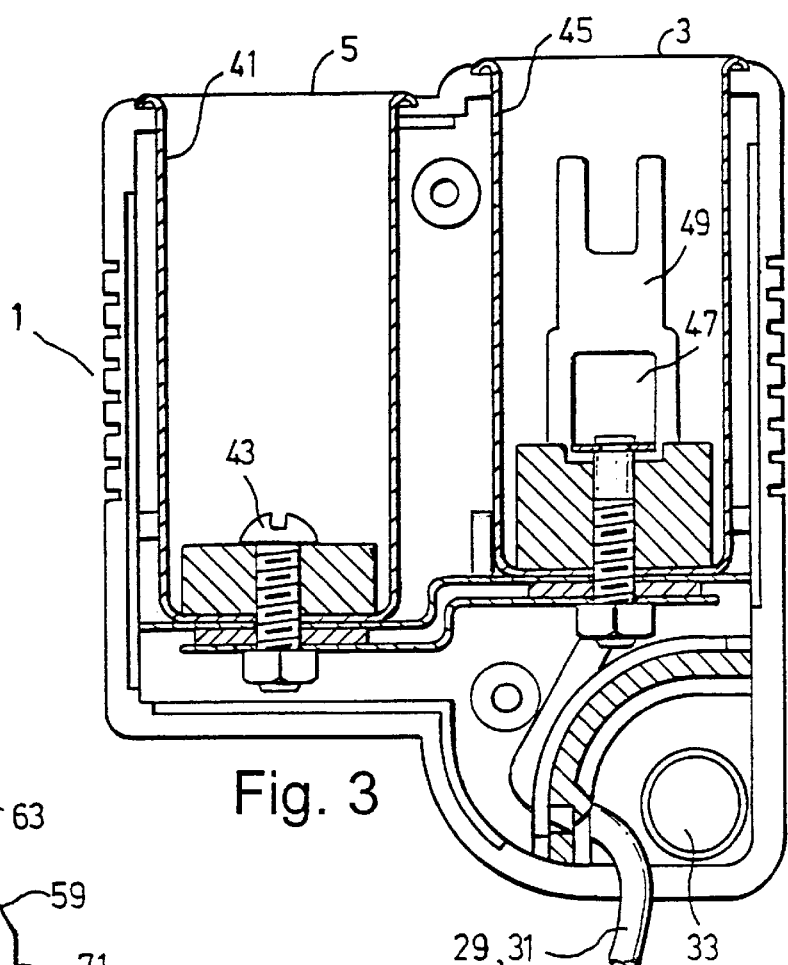
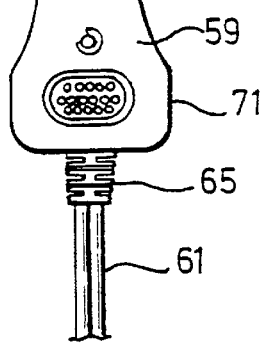
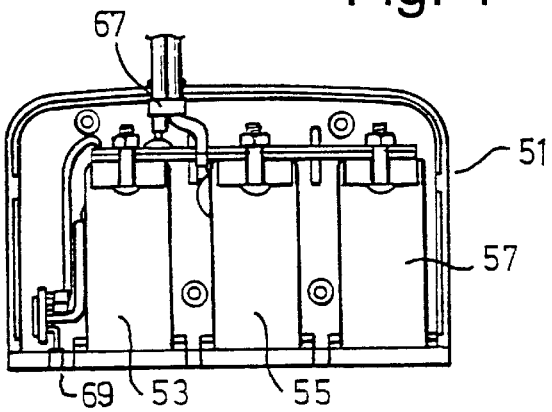
Fig. 3
Fig. 4

CIGARETTE LIGHTER SOCKET ADAPTER WITH IMPROVED CONTACT, DUAL SOCKETS, AND/OR MOVABLE PLUG

BACKGROUND OF THE INVENTION

1. Field of the Invention

The present invention relates to an electrical adapter. In particular, the present invention relates to an adapter for a vehicle cigarette/cigar lighter socket.

2. Description of the Related Art

Many modern vehicles are provided with cigarette/cigar lighters. The lighter usually comprises a socket with a removable lighter cap. When activated, the current flows through a high resistance strip in the lighter cap causing a part of the cap to glow red-hot. A cigarette or cigar can then be lit from the glowing metal.

The socket can be used to power a large range of portable appliances, for example, mobile phones, car vacuum cleaners, lap-top computers, televisions, chiller cabinets, etc. Recently, the sockets on their own (without the cigarette lighter cap) have been provided in the back of MPV's, off road vehicles, etc. Some appliances can be powered directly from the socket itself, others may require an adapter.

The adapter has a plug member which is inserted into the vehicle lighter socket. The plug member is elongate with a first contact at one end. The first electrical contact connects to a co-operating electrical contact at the base of the vehicle lighter socket. To ensure a good and reliable connection, it is preferable if the first electrical contact is mounted on said plug member such that the contact is resiliently biased towards the end of said plug member. In previous adapters, the first contact is electrically and mechanically connected to the remainder of the adapter via a spring.

This type of conventional spring contact creates a higher resistance and hence the adapter gets very hot. When the adapter is connected with heavy duty appliances, for example, spot-light, car vacuum cleaner, car heater, electrical heat pot, etc., an "oven" effect will occur in the spring. The spring is typically made from mild steel.

BRIEF SUMMARY OF THE INVENTION

The present invention provides an adapter for a vehicle cigarette lighter socket, the adapter comprising an adapter body, with at least one socket member and an elongate plug member attached to said adapter body, the elongate plug member having a first electrical contact at an end of said elongate plug member, the first electrical contact being electrically connected to the adapter via a ribbon form spring contact.

In the present invention, a ribbon form of spring contact (or plate-type contact) is used instead of a mild steel spring. The ribbon form contact is a ribbon of metal which is positioned so that it resiliently biases the first contact towards the end of the plug member. This ribbon form contact allows the adapter to have a lower resistance and hence less heat is generated. Therefore, adapters according the present invention are more stable in function and are more hard wearing.

The ribbon form contact is used to resiliently bias the first contact towards the end of said plug member. To do this, it is preferable if the first contact is mounted to the plug member via just the ribbon form contact. More preferably, the ribbon form contact is substantially s-shaped, the first electrical contact being mechanically connected to a wall of said plug member.

Preferably, the adapter comprises a fuse. If the adapter comprises a fuse, the socket member is electrically connected t o the plug member via the fuse. The fuse in the adapter is preferably 10 amp. This fuse may need to be replaced. Therefore, to aid replacement, it is preferable if the fuse is located on an outer surface of the adapter body.

As many appliances can be powered from the lighter socket, it is preferable if the adapter body comprises at least two socket members.

Therefore, according to a second aspect, the present invention provides an adapter for a vehicle lighter socket, the adapter comprising an adapter for a vehicle cigarette lighter socket, the adapter comprising an adapter body, with at least two socket members and a single elongate plug member attached to said adapter body, wherein the socket members are electrically connected to said plug member.

The single elongate plug member is for insertion into the single vehicle lighter socket and two appliances can n be powered from the first and second socket members. For example, one of the socket members could provide power to charge a mobile phone and the cigarette lighter cap could be fitted to the second socket member.

Of course, the present invention need not be limited to an adapter with just two socket members. Therefore, it may be preferable if the adapter comprises at least three socket members which are electrically connected to said plug member.

The actual socket acquired to provide power to a cigarette lighter cap is more complicated than a socket required to just give power. Conventional cigarette lighter sockets are a female type member with cylindrical walls and a flat socket base. The terminal is provided by part of the inside of the cylindrical walls and the second terminal is a piece of metal fixed at the bottom of the socket. The metal piece is shaped so that it extends partially up the cylindrical walls. The first and second terminals must be isolated from one another. Therefore, the conductor part of the cylinder wall must be cut so that it does not touch the second terminal.

This manufacturing process is time concerning and many of the appliances which can be run from a cigarette lighter socket cam make do with a much simpler design where all of the inside of the cylinder walls conducts and the second terminal is provided by a screw in the base of the socket.

Many lighter sockets are located in relatively awkward places in a vehicle. For example, they are often located close to and opposite the gear stick. Therefore, in some cases it is awkward to plug an appliance into the adapter. To overcome this problem, it is preferable if the plug can be moved relative to the adapter body.

Therefore, in a third aspect, the present invention provides an adapter for which a vehicle cigarette lighter socket, the adapter comprising an adapter for a vehicle cigarette lighter socket, the adapter comprising an adapter body, with at least one socket members and a single elongate plug member attached to said adapter body, wherein the at least one of the socket members is electrically connected to said plug member and said plug member is movable relative to said adapter body.

According to the first, second and third aspects of the present invention it is preferable if, the elongate plug member of the present invention is pivotally mounted on said adapter body. The adapter body can thus be pivoted to a more suitable position, for example pointing towards the passenger side footwell.

Alternatively the elongate plug member may be connected to the adapter body via a flexible lead.

It is preferable if the adapter is provided with an indicator which shows when the adapter can supply power. This is particularly useful for troubleshooting when an appliance which is plugged into the adapter doesn't work. The indicator is preferably provided by an LED. If the LED is not lit then the user knows that there is a problem with either the adapter or the cigarette lighter socket itself as opposed to the appliance.

BRIEF DESCRIPTION OF THE SEVERAL VIEWS OF THE DRAWINGS

The present invention will now be explained with reference to preferred non-limiting embodiments and described with reference to the accompanying drawings in which:

FIG. 3 shows a cross section taken through the side of the casing shown in FIG. 1; and FIG. 4 shows a cross section of an adapter according to a second embodiment of the present invention.

DETAILED DESCRIPTION OF THE INVENTION

Figure 1:
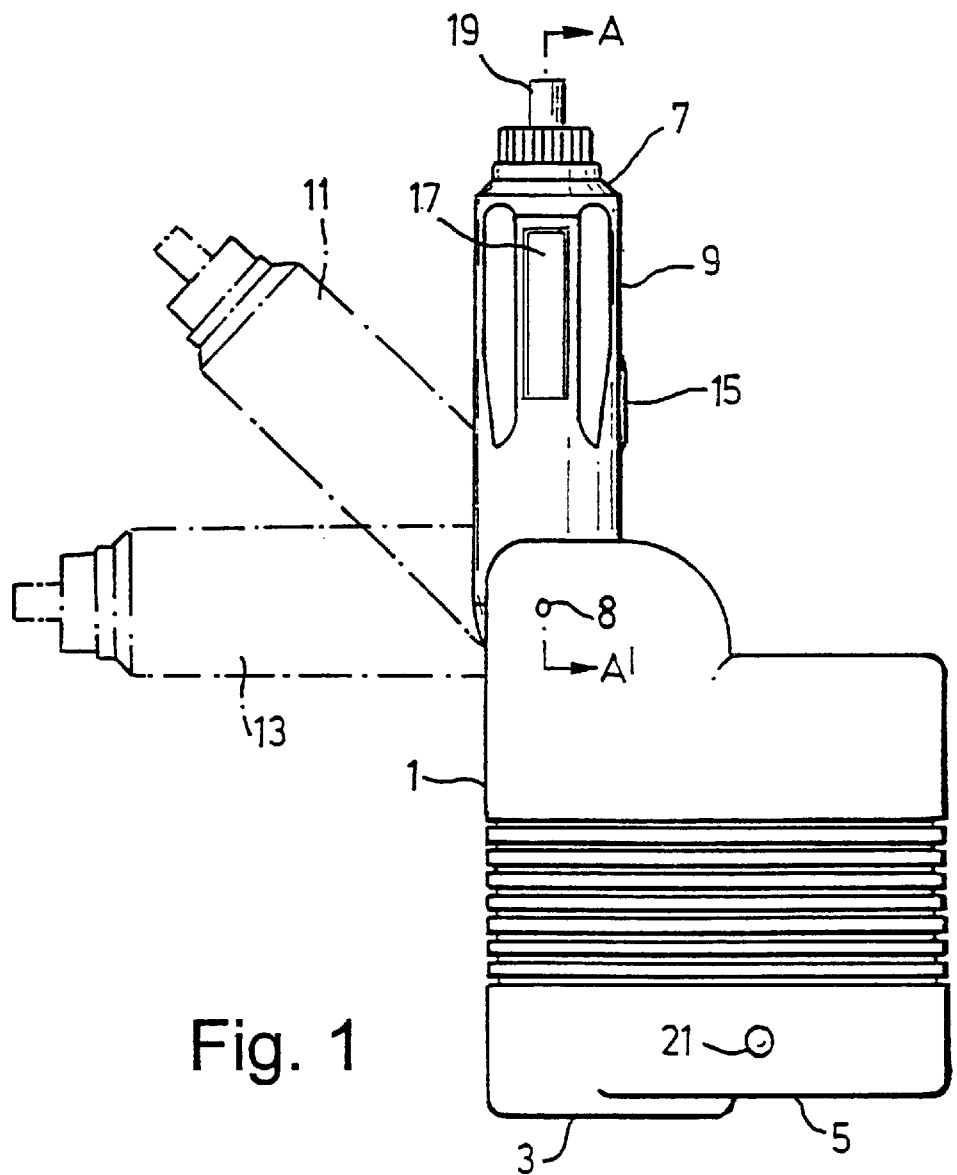
FIG. 1 is a plan view of an adapter according to a first embodiment of the present invention.

FIG. 1 shows an adapter body 1. The body 1, encases socket members 3 and 5. These socket members 3, 5 are shown in more detail in FIG. 3. Plug member 7 is pivotally mounted to adapter to body 1. The plug member 7 can be rotated about axis (into page) 8 from position 9 through position 11 to position 13. The plug member is mounted so that it can be fixed in motion at positions 11 and 13 so that it does not move when the vehicle is in motion.

The fuse 15 is located on the outside of plug member 7. The fuse is located on the outside of the adapter for easier replacement.

The plug member 7 is designed so that it fits into a vehicle lighter socket. Resilient member 17 forms the first electrode which contacts inner walls of the vehicle lighter socket and top member 19 forms second electrode which contacts the fuse of the light socket.

The adapter also has a light 21 which is lit when the adapter is ready for use.

Figure 2:
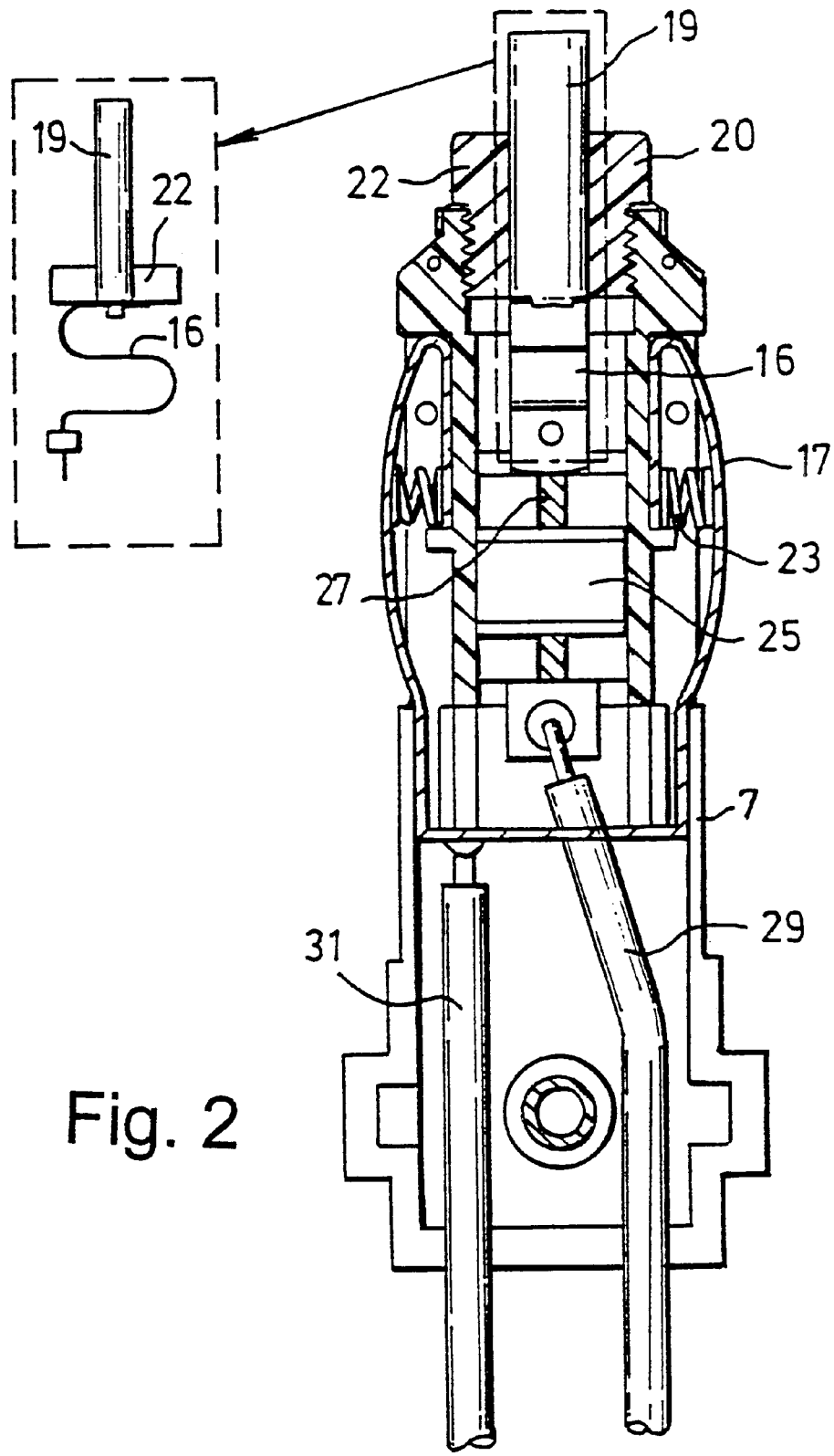
FIG. 2 is a cross section of the plug of the adapter shown in FIG. 1 along line A–A$^1$

FIG. 2 shows a cross section of the extended plug member 7. The first electrode 17 is seen to be a continuous metal sheet and the electrode is pushed against the inside of the lighter socket by springs 23. The second electrode (first electrical contact) 19 is connected to the ribbon form contact 16. The plate type contact is s-shaped. In the figure, the s-shaped contact is viewed from the front i.e. the s-shape is only visible when viewed from the side of the first electrode 17 (as shown in insert). The ribbon form contact 16 pushes the second electrode 19 towards to tip 20 of the plug member. Retainer ring 22 stops the second electrode 19 from moving from side to side.

The ribbon form contact 16 is connected via lead 27 to a fuse that will bridge gap 25. The signal from electrode 19 is carried to the sockets 3, 5 in the adapter body via lead 29. The first electrode 17 is connected to lead 31.

FIG. 3 shows the sockets 3 and 5 in detail. The extended plug member 7 is attached and pivots about point 33. The electrical signal from the plug 7 is carried via leads 29 and 31. Lead 29 is obscured by lead 31 in FIG. 3.

Sockets 3 and 5 are seen to be different. Simple socket 5 is a female socket member with cylindrical walls 41 and a screw 43 at its base. The cylindrical walls 41 are coated with a conductive material on its inside and it forms the first terminal. Screw 43 provides the second terminal.

Socket member 3 is a more complicated type of socket which is specifically required for use with a cigarette lighter. Similar to socket 5, socket 3 is a female member with cylindrical walls 45 and a base. However, here the second electrode 47 is provided by a piece of metal which is bent to extend partially up the sides of the cylindrical walls 45. Therefore, only a part of the inside of the cylindrical walls 45 can form the first terminal as the first and second terminals must be isolated from one another when the socket is not in use. Therefore, a conductive coating is applied to the inside of cylindrical wall 45 everywhere except the gap regions 49. It can be seen that the gap is both taller and wider than the first terminal 47.

Preferably, the adapter body 1 and plug 7 are made of plastic. In the preferred embodiment, the adapter body is made from ABS and the plug body is made from a polycarbonate.

FIG. 4 shows a second embodiment for an adapter in accordance with the present invention.

As for the embodiment shown in FIGS. 1 to 3, the adapter has an adapter body 51 which encases three socket members 53, 55 and 57. The internal instruction for the socket membersis essentially the same as that shown for the first embodiment in FIG. 3. Therefore, the details of the construction will not be further discussed here.

Plug member 59 is attached to adapter body 51 via flexible lead 61. Therefore, plug member 59 and adapter body 51 can be moved relative to one another. The flexible lead 61 carries electricity between plug 59 and adapter body 51.

A fuse 63 is located on outside of plug member 59 as shown in embodiment 1, which is connected to electrode 17 by a ribbon form contact.

Flex 61 is connected to plug member 59 via flex clip 65. Flex 61 is connected to adapter body 51 via flex clip 67.

The internal details of the plug member are exactly the same as those described with reference to FIG. 2. Therefore, the will not be repeated here.

The adapter body also has an indicator lamp 69 which shows when the adapter is ready for use.

It will be noted, that the plug member here is wider at its base 71 than the plug member 7 shown in FIG. 1. The is simply to provide an easier handle to grip for removal of the plug from the lighter socket. IN the embodiment shown in FIG. 1. As the adapter body 1 is rigidly connected to plug member 7 the adapter can be removed by pulling on the adapter body 1. Pulling on the adapter body 51 in embodiment 3 will put a large strain on flex 61.

The socket members 53, 55, and 57 are shown as being simple socket members. However, it will be appreciated by those skilled in the art that a more complicated socket for a cigarette lighter could be used to replace one of the sockets.

What is claimed is:

1. An adapter for a vehicle cigarette lighter socket, the adapter comprising an adapter body, with at least two socket members and an elongate plug member attached to said adapter body, the elongate plug member having a first electrical contact at an end of said elongate plug member, the first electrical contact being electrically connected to the socket members via a ribbon form spring contact;

wherein the ribbon form contact is s-shaped and said first electrical contact is mechanically connected to a top of the S of said s-shaped ribbon form contact;

wherein the socket members are both female socket receptacles each having cylindrical sidewalls and an end opening for receiving a mating appliance plug and wherein the socket members are electrically connected to the first electrical contact via a fuse which is located on an outer surface of the plug member;

wherein the plug member is pivotally mounted to said adapter body so as to be movable with respect to said adapter body.

2. An adapter according to claim 1, wherein the adapter body comprises three or more socket members which are electrically connected to said plug member.

3. An adapter according to claim 1 wherein one of the socket members is configured as a vehicle cigarette lighter socket.

4. An adapter according to claim 3 wherein the adapter further comprises an indicator which indicates that the adapter can supply power.

5. An adapter for a vehicle cigarette lighter socket, the adapter comprising an adapter body, with at least two socket members and an elongate plug member attached to said adapter body, the elongate plug member having a first electrical contact at an end of said elongate plug member, the first electrical contact being electrically connected to the rest of the adapter via a ribbon form spring contact;

wherein the ribbon form contact is s-shaped and said first electrical contact is mechanically connected to a top of the S of said s-shaped ribbon form contact;

wherein the socket members are electrically connected to the first electrical contact via a fuse which is located on an outer surface of the plug member;

wherein the socket members are configured differently, one of the socket members comprising a female socket member with cylindrical walls and a screw at a base thereof, the cylindrical walls being coated with a conductive material to form a first terminal, the other of the socket members being configured for use with a cigarette lighter and comprising a female socket member with cylindrical sidewalls and with a bent piece of metal which extends partly up the sidewalls forming a second electrode, only a portion of the cylindrical sidewalls of the other of the socket members being coated with a conductive material to form a first electrode so that the first and second electrodes are isolated from one another when the socket is not in use.

wherein the plug member is pivotally mounted to said adapter body so as to be movable with respect to said adapter body.

* * * * *